United States Patent [19]

Okimura et al.

[11] Patent Number: 5,489,648
[45] Date of Patent: Feb. 6, 1996

[54] MODIFIED POLYOLEFIN AND COMPOSITION CONTAINING THE SAME

[75] Inventors: Yoshihiko Okimura; Taizo Aoyama, both of Takasago; Hiroki Kobayashi, Kobe; Akinori K. Shu; Kazuhiro Hara, both of Takasago, all of Japan

[73] Assignee: Kanegafuchi Kagaku Kogyo Kabushiki Kaisha, Osaka, Japan

[21] Appl. No.: 254,043

[22] Filed: Jun. 3, 1994

[30] Foreign Application Priority Data

Jun. 10, 1993 [JP] Japan .................. 5-139641

[51] Int. Cl.⁶ .................. C08F 255/02; C08L 51/06
[52] U.S. Cl. .................. 525/71; 525/80; 525/263; 525/309; 525/322; 524/504
[58] Field of Search .................. 525/309, 80, 71, 525/263, 322; 524/504

[56] References Cited

U.S. PATENT DOCUMENTS

| | | | |
|---|---|---|---|
| 4,097,554 | 6/1978 | Yui et al. | 260/878 |
| 4,370,450 | 1/1983 | Grigo | 525/262 |
| 5,237,004 | 8/1993 | Wu | 525/85 |

FOREIGN PATENT DOCUMENTS

| | | |
|---|---|---|
| 0418861 | 3/1991 | European Pat. Off. . |
| 0476960 | 3/1992 | European Pat. Off. . |
| 52-63813 | 7/1977 | Japan . |
| 59-14061 | 4/1984 | Japan . |
| 3-078482 | 2/1991 | Japan . |

OTHER PUBLICATIONS

European Search Report for Application No. 94108686.0, mailed Sep. 16, 1994.
Kautschuk Und Gummi—Kunststoffe, No. 10, 1977, Heidelberg De pp. 725–729 H. Alberts, H. Bartgl, R. Kuhn, U. Steffen, "Neue Ergebnisse Auf Dem Gebiet Der Pfropfcopolymerisation" pp. 726 and 727.

*Primary Examiner*—Vasu S. Jagannathan
*Attorney, Agent, or Firm*—Varndell Legal Group

[57] ABSTRACT

A modified polyolefin prepared from an aqueous suspension containing (a) a crystalline polyolefin, (b) 1 to 500 parts by weight of a vinyl monomer per 100 parts by weight of the crystalline polyolefin, and (c) 0.01 to 10 parts by weight of a radical polymerization initiator per 100 parts by weight of the vinyl monomer by impregnating the crystalline polyolefin (a) with the vinyl monomer (b) and heating the aqueous suspension to polymerize the vinyl monomer (b) at a temperature equal to or higher than a temperature at which the crystal region of the polyolefin (a) begins to substantially melt, which has an excellent effect of improving processability of other polyolefins and provides a polyolefin composition having excellent properties such as processability, impact resistance, rigidity and surface properties when the modified polyolefin is incorporated into polyolefins optionally with a core-shell graft copolymer and/or an inorganic filler.

20 Claims, No Drawings

MODIFIED POLYOLEFIN AND COMPOSITION CONTAINING THE SAME

BACKGROUND OF THE INVENTION

The present invention relates to a modified polyolefin resin, and more particularly to a modified polyolefin resin which comprises a crystalline polyolefin, and a vinyl polymer prepared by a polymerization in the presence of the crystalline polyolefin specific in a manner so as to be dispersed in the fine particle form in the crystalline polyolefin as a matrix and to be at least partially grafted to the polyolefin, and which can improve the melting property of various other polyolefins, thus having an excellent effect of improving processability of other polyolefins. The present invention also relates to a polyolefin composition containing a polyolefin and the modified polyolefin resin, and more particularly to a polyolefin composition having excellent properties such as processability, impact resistance, rigidity and surface properties and being suitably applicable to the production of various molded articles.

Polyolefins have been widely utilized in various molded articles, since they are inexpensive and are superior in physical properties. However, they have problems.

For example, polypropylene has drawbacks that it is poor in processability such as thermoformability of the sheet (hereinafter referred to as "thermoformability"), calendering, blow moldability and expansion moldability since the melt viscosity and the melt tension are small, and that it is poor in rigidity as compared with polystyrene, polyvinyl chloride, ABS resin and the like, and that it is also poor low temperature impact resistance, surface properties such as gloss and hardness, and coatability.

In order to improve the processability of polypropylene, polyethylene has been generally incorporated into polypropylene by mechanical mixing. However, since the processability improving effect of polyethylene is insufficient, a large amount of polyethylene is required for this purpose, thus resulting in lowering of rigidity.

It is attempted to raise the melt viscosity and melt tension of polyolefins by increasing the molecular weight. However, use of polyolefins having a high molecular weight encounters a serious problem that they are difficult to be processed by extrusion which is one of important processing methods therefor.

It is proposed in U.S. Pat. No. 4,156,703 to improve the processability of polyethylene by adding a non-crosslinked acrylic polymer thereto. However, since compatibility between them is not sufficient and since the acrylic polymer added is non-crosslinked, the acrylic polymer separates from polyethylene when processed by calendering or extrusion, and it adheres to the surface of a calender roll or the surface of an extrusion die (this phenomenon being hereinafter referred to as "plate out"). Thus, the processability rather lowers.

For the purpose of improving the processability such as thermoformability of polypropylene, it is proposed in Japanese Patent Publication Kokai No, 2-22316 to add to polypropylene a mixture of a polyolefin, a methacrylate polymer and a polyolefin-methacrylate graft copolymer, which is obtained by polymerizing a methacrylic acid ester monomer in the presence of the polyolefin in a hydrocarbon solvent. However, this proposal has drawbacks that a large amount of the mixture is required for sufficiently exhibiting the effect of improving the processability, problems in preparation cost and safety arise since a solution polymerization at high temperatures is adopted, and the workability and safety are inferior since the solvent must be removed from the polymerization reaction mixture before adding to polypropylene.

Improvement processability such as thermoformability of polypropylene is also proposed in Japanese Patent No. 1,241,800 wherein polymer particles, as disclosed in Japanese Patent No. 1,219,793, prepared by polymerizing a vinyl monomer in the presence of polypropylene particles in an aqueous suspension at a temperature at which the polypropylene is not substantially molten, are added to a polypropylene in order to improve its processability. The polymer particles proposed as a modifier are characterized in that when they are blended with a polypropylene to be improved, fine dispersed units of the produced vinyl polymer in the modifier are uniformly dispersed in the resulting blend without agglomeration. However, the compatibility of the proposed modifier with polypropylene is insufficient, and the processability of polypropylene is not sufficiently improved by mere uniform dispersion of fine vinyl polymer units into the polypropylene.

Further, in order to improve impact resistance of polyolefins, a rubber component such as ethylene-propylene rubber has been generally introduced by mechanical mixing or block copolymerization. However, this method has the drawbacks that since it is difficult to control the size of particles to be dispersed in the polyolefins, the efficiency in use of the rubber component is low, thus the effect on improvement of impact resistance is not sufficiently exhibited, and that for such a reason, a large amount of the rubber component is required, so the rigidity of the obtained mixture is decreased. Also, the particle size of the dispersed rubber component is large, so the surface gloss of molded articles is lowered.

Core-shell modifiers which have been widely used as impact modifiers for vinyl chloride resins and the like, can cause to efficiently disperse a rubber component (core phase) having a predetermined particle size into matrix polymers, thus the impact resistance of the matrix polymers can be improved with preventing the rigidity from lowering. However, these core-shell modifiers have the problem that they are poor in compatibility with polyolefins which are non-polar, and they are hardly applicable to polyolefins.

Accordingly, it has been proposed to apply the core-shell modifiers to polyolefins in the presence of specific compatibilizers, as disclosed in Japanese Patent Publication Kokai No. 3-185037 and U.S. Pat. No. 4,997,884. However, the process steps for preparing these compatibilizers are complicated, so the use of compatibilizers increases the cost and also makes the system complicated.

There has not yet been proposed a polyolefin or a polyolefin composition which satisfies all of properties such as processability, impact resistance, rigidity and surface properties.

Accordingly, it is an object of the present invention to provide a polyolefin or a polyolefin composition which can satisfy all of the above-mentioned properties.

A further object of the present invention is to provide a modified polyolefin which can improve the melting property of polyolefin resins without substantially impairing other properties thereof and accordingly is useful as a modifier for improving the processability of polyolefin resins.

Another object of the present invention is to provide a polyolefin composition containing the modified polyolefin, which has an excellent processability and provides polyolefin molded articles having excellent physical properties such as impact resistance, rigidity and surface properties.

These and other objects of the present invention will become apparent from the description hereinafter.

SUMMARY OF THE INVENTION

It has been found that a polyolefin modified by impregnating a crystalline polyolefin with a vinyl monomer in an aqueous suspension thereof, and heating the aqueous suspension at a specific temperature to polymerize the vinyl monomer, has an excellent effect of improving the processability of polyolefins such as moldability into sheets and, therefore, it is suitable as a modifier for various polyolefins and provides a polyolefin composition which simultaneously satisfies properties such as processability, impact resistance, rigidity and surface properties. In particular, the modifier according to the present invention can raise the melt viscosity and melt tension of polyolefins at a low rate of shear, and can remarkably improve the resistance to draw down, which is a measure for thermoformability, blow molding or the like, without imparing the elongation of sheets of the polyolefins.

In accordance with the present invention, there is provided a modified polyolefin prepared by a process which comprises preparing an aqueous suspension containing (a) a crystalline polyolefin, (b) 1 to 500 parts by weight of a vinyl monomer per 100 parts by weight of the crystalline polyolefin, and (c) 0.01 to 10 parts by weight of a radical polymerization initiator per 100 parts by weight of the vinyl monomer, impregnating the crystalline polyolefin (a) with the vinyl monomer (b), and polymerizing the vinyl monomer (b) at a temperature equal to or higher than a temperature at which the crystal region of the crystalline polyolefin (a) begins to substantially melt.

Prior to the polymerization of the vinyl monomer (b), the aqueous suspension may be optionally heated under a condition that the vinyl monomer (b) is not substantially polymerized, whereby the polymerization is prevented from proceeding in the state that the vinyl monomer (b) forms dispersed particles independent from the crystalline polyolefin particles (a), and the impregnation of the vinyl monomer into the polyolefin particles is ensured.

The present invention also provides a polyolefin composition comprising (A) a polyolefin, (B) 0.01 to 100 parts of the above-mentioned modified polyolefin, and optionally at least one of (C) 0.01 to 100 parts of a core-shell graft copolymer prepared by graft-polymerizing 5 to 60% by weight of a monomer component comprising a vinyl compound onto 40 to 95% by weight of a crosslinked rubber-like polymer and (D) 0.1 to 1,000 parts of an inorganic filler, said parts of (B), (C) and (D) being parts by weight per 100 parts by weight of (A).

The processability, impact resistance and surface properties of polyolefins are further improved by incorporating the core-shell polymer (C) into the polyolefin (A) with the modified polyolefin (B). Since the dispersibility of an inorganic filler is improved, sheets or films prepared from the polyolefin composition by calendering or extrusion have improved surface properties even if the filler is added to the composition. Also, the shrink, warpage and the like in injection molding are decreased, thus the polyolefin composition according to the present invention has an improved injection moldability. The rigidity is raised by incorporating an inorganic filler (D).

DETAILED DESCRIPTION

The modified polyolefin according to the present invention is prepared by a process which comprises the steps of dispersing (a) a crystalline polyolefin, (b) 1 to 500 parts by weight of a vinyl monomer per 100 parts by weight of the crystalline polyolefin and (c) 0.01 to parts by weight of a radial polymerization initiator per 100 parts by weight of the vinyl monomer in water with or without a suspending agent, emulsifying agent or a dispersing agent, impregnating the polyolefin (a) with the vinyl monomer (b), and polymerizing the vinyl monomer (b) at a temperature equal to or higher than a temperature at which the crystal region of the polyolefin (a) begins a substantial fusion.

Various polyolefins having a crystallinity are used as the crystalline polyolefin (a), e.g. propylene homopolymer, ethylene homopolymer, an α-olefin homopolymer and a copolymer of a major amount of propylene with at least one of comonomers, for example, ethylene and ethylenically unsaturated monomers such as butene and other α-olefins. Representative examples of the crystalline polyolefin (a) are, for instance, isotactic polypropylene, syndiotactic polypropylene, propylene-ethylene random copolymer, propylene-ethylene block copolymer, high density polyethylene, low density polyethylene, linear low density polyethylene, poly-1-butene, polyisobutylene, polymethylpentene, and the like. The crystalline polyolefins may be used alone or in admixture thereof.

Propylene homo- and copolymers containing at least 75% by weight of propylene are preferred as the crystalline polyolefin (a), since the modified polyolefin obtained therefrom has an excellent compatibility with propylene-based polyolefins and can sufficiently exhibit an effect on improvement of the processability of the propylene-based polyolefins.

The crystalline polyolefin (a) used may be in any form, e.g. pellets, powder, latex or dispersion.

Examples of the vinyl monomer (b) are, for instance, an aromatic vinyl compound such as styrene or α-methylstyrene; an alkyl methacrylate, particularly an alkyl methacrylate having a $C_1$ to $C_{22}$ alkyl group, such as methyl methacrylate, ethyl methacrylate, n-butyl methacrylate, isobutyl methacrylate, t-butyl methacrylate, 2-ethylhexyl methacrylate or stearyl methacrylate; an alkyl acrylate, particularly an alkyl acrylate having a $C_1$ to $C_{22}$ alkyl group, such as methyl acrylate, ethyl acrylate, n-butyl acrylate, isobutyl acrylate, t-butyl acrylate, 2-ethylhexyl acrylate or stearyl acrylate; an unsaturated nitrile compound such as acrylonitrile or methacrylonitrile; and the like. These vinyl monomers may be used alone, in admixture thereof, or with at least one of other copolymerizable vinyl monomers having a reactive functional group such as acid anhydride group, carboxyl group, amino group, amido group, epoxy group or hydroxyl group, e.g. maleic anhydride, methacrylic acid, acrylic acid, methacrylamide, acrylamide, dimethylaminoethyl methacrylate, dimethylaminoethyl acrylate, glycidyl methacrylate, hydroxyethyl methacrylate or hydroxyethyl acrylate.

From the viewpoint of a better effect on improvement of the processability of polyolefins, and from the viewpoints of the versatility and cost of monomers used, it is preferable to use, as the vinyl monomer (b), a mixture of 80 to 100% by weight of at least one monomer selected from the group consisting of an aromatic vinyl compound, an alkyl methacrylate having a $C_1$ to $C_{22}$ alkyl group, especially a $C_1$ to $C_4$ alkyl group, an alkyl acrylate having a $C_1$ to $C_{22}$ alkyl group, especially a $C_1$ to $C_8$ alkyl group, and an unsaturated nitrile compound with 20 to 0% by weight of other vinyl monomers copolymerizable therewith, preferably a mixture of 80 to 100% by weight of at least one monomer selected from the group consisting of styrene, methyl methacrylate and n-butyl acrylate with 20 to 0% by weight of other vinyl monomers copolymerizable therewith, more preferably a single use of styrene, methyl methacrylate or n-butyl acrylate.

Radical polymerization initiators having a halflife of about 1 hour at a temperature of about 50° to about 200° C. are preferred as the radical initiator (c) used in the present invention, since they produce radical polymerization initiation sites in the crystalline polyolefin (a) which is substantially in the molten state, and since the polymerization of the vinyl monomer (b) and the graft polymerization of the vinyl monomer (b) onto the polyolefin (a) efficiently proceed. Radical initiators which are oil-soluble and have a high hydrogen abstraction property, are also preferred from the viewpoint of obtaining a modified polyolefin which can sufficiently exhibit an effect of improving the processability of polyolefins when added thereto.

Examples of the radical polymerization initiator (c) are, for instance, acetyl peroxide, disuccinic acid peroxide, t-butyl peroxyoctoate, benzoyl peroxide, t-butyl peroxymaleate, 1-hydroxy- 1-hydroperoxydicyclohexyl peroxide, 1,1-bis(t-butylperoxy)-3,3,5-trimethylcyclohexane, t-butyl peroxycrotonate, 2,2-bis(t-butylperoxybutane), t-butylperoxy isopropylcarbonate, t-butyl peroxypivalate, lauroylperoxide, t-butyl peroxyisobutylate, di-t-butyl peroxide, 1,1,3,3-tetramethylbutyl peroxy-2-ethylhexanoate, 2,5-dimethyl- 2,5-bis(2-ethylhexanoylperoxy)hexane, 2,5-dimethyl-2,5-bis(benzoylperoxy)hexane, t-butyl peracetate, 2,5-dimethyl-di(hydroperoxy)hexane, t-butyl hydroperoxide, t-butyl cumylperoxide, p-menthane hydroperoxide, methyl ethyl ketone peroxide, di-t-butyl peroxyphthalate, t-butyl peroxybenzoate, dicumyl peroxide, 2,5-dimethyl- 2,5-di(t-butylperoxy)hexane, 2,4-pentanedione peroxide, azobisisobutyronitrile, and other known peroxides such as ketone peroxide, diacyl peroxide, hydroperoxide, dialkyl peroxide, peroxy ketal, alkyl perester and peroxy carbonate. These initiators may be used alone or in admixture thereof.

Crystalline polyolefin (a), vinyl monomer (b) and radical polymerization initiator (c) are added to water and mixed to prepare an aqueous suspension. The proportion of the vinyl monomer (b) to the crystalline polyolefin (a) in the aqueous suspension is from 1 to 500 parts by weight, preferably 5 to 200 parts by weight, more preferably 10 to 100 parts by weight, per 100 parts by weight of the polyolefin (a). When the amount of the vinyl monomer (b) is less than 1 part by weight, the amount of the production of a polyolefin wherein the vinyl monomer (b) is graft-polymerized onto the polyolefin (a) is small in the resulting modified polyolefin, thus the processability improving effect of the obtained modified polyolefin is insufficient. When the amount of the vinyl monomer (b) is more than 500 parts by weight, polymer particles may excessively agglomerate, fuse together or form a mass in the aqueous suspension during the polymerization because polymerization mainly occurs between the monomers (b).

The radical polymerization initiator (c) is used in an amount of 0.01 to 10 parts by weight, preferably 1 to 10 parts by weight, more preferably 1 to 5 parts by weight, per 100 parts by weight of the vinyl monomer (b). When the amount of the radical initiator (c) is less than 0.01 part by weight, it is hard to obtain a modified polyolefin having a sufficient effect of improving the processability, since radical polymerization initiation sites for the polymerization of the monomer (b) and graftlinking sites on the polyolefin (a) are not sufficiently produced. When the amount of the radical initiator (c) is more than 10 parts by weight, the initiator (c) is present excessively and, therefore, the obtained modified polyolefin may cause degradation of polyolefins to be improved when it is added to the polyolefins and the resulting mixture is thermally formed into shaped articles.

The polymerization is carried out in the state that the polyolefin (a) is impregnated with the vinyl monomer (b). Prior to the polymerization, the aqueous suspension may be heated with or without stirring, as occasion demands, under a condition that the vinyl monomer (b) is not substantially polymerized, in other words, at a temperature at which the polymerization does not substantially occur. Such a temperature is usually selected from T–50° C. to T–10° C., preferably from T–40° C. to T–10° C., wherein T is a 10 hour half-life temperature of the radical initiator (c) used. The impregnation of the monomer (b) into the particles of the polyolefin (a) is ensured by heating the aqueous suspension to such a temperature, whereby the monomer (b) is prevented from polymerizing in the state that it forms dispersed particles independent from the crystalline polyolefin particles in the aqueous suspension.

The heating time for the impregnation varies depending on the kinds of the crystalline polyolefin and vinyl monomer used and the like, but in general the heating time is preferably not more that about 5 hours.

The polymerization is carried out at a temperature equal to or higher than a temperature at which the crystal region of the crystalline polyolefin (a) begins to substantially melt. The temperature (Tm) at which the crystal region of the crystalline polyolefin (a) begins to substantially melt means, in a fusion curve of the crystalline polyolefin (a), intermediate point between the starting temperature of fusion and the melting point (temperature corresponding to the top of the peak in the fusion curve) wherein the fusion curve is one obtained by differential scanning calorimetry (DSC) by elevating the temperature at a rate of 10° C./minute in a nitrogen stream (40 ml/minute) from room temperature to temperature at which the polyolefin is completely melted, as shown by the following equation:

$$Tm = (\text{fusion starting temp.} + \text{melting point})/2$$

Preferably, the polymerization is carried out at a temperature within the range of melting point ±20° C., especially melting point ±10° C., from the viewpoints that the proportion of the non-crystalline portion (amorphous portion) in the polyolefin (a) is increased and the cleavage of polyolefin chains or gellation owing to excessive heating do not excessively occur.

The polymerization time varies depending on the kinds of polyolefin (a) and vinyl monomer (b) used and the like, but is usually from about 0.5 to about 10 hours.

Even if the aqueous suspension is heated to a temperature lower than Tm, a temperature at which the crystal region of the polyolefin (a) begins to substantially fuse, the polymerization of the vinyl monomer (b) proceeds. However, the grafting of the vinyl monomer (b) onto the polyolefin (a) does not proceed or does not sufficiently proceed. Thus, it is possible to finely disperse the resulting vinyl polymer into each of the polyolefin particles (a), but the thus obtained product does not have a sufficient effect of improving the processability of other polyolefins.

In contrast, when the aqueous suspension is heated to a temperature above Tm, namely a temperature of not lower than a temperature at which the crystal region of polyolefin (a) begins to substantially fuse, the proportion of the non-crystal portion in the polyolefin (a) is increased and the graft polymerization of the vinyl monomer (b) onto the non-crystal portion of the polyolefin is particularly accelerated at the same time as the polymerization of the vinyl monomer per se to form non-grafted vinyl polymer.

The modified polyolefin of the present invention is characterized by containing a polyolefin grafted with a polymer of the vinyl monomer (b), namely a polyolefinvinyl monomer graft copolymer. A part of the vinyl monomer (b) is polymerized in the polyolefin particles without graft-polymerizing onto the polyolefin (a) to form a vinyl polymer which is dispersed in the individual polyolefin particles in the form of fine units. Accordingly, when the modified polyolefin is admixed with other polyolefins in order to improve their processability, the vinyl polymer can be uniformly and finely dispersed in these matrix polyolefins to be improved. However, the vinyl polymer-grafted polyolefin has a larger influence upon improvement in processability rather than fine units of the vinyl polymer uniformly dispersed in the product.

Water, suspending agent, emulsifying agent, dispersing agent or other ingredients may be suitably used in the preparation of the modified polyolefin. The kinds and amounts thereof are not particularly limited so long as the aqueous suspension containing the starting materials or the reaction products is maintained in a stable state of such an extent that it does not cause excessive agglomeration, melt adhesion or the like under conditions of temperature, pressure, stirring and the like in the preparation of the modified polyolefin.

The modified polyolefin of the present invention has an excellent effect of improving the processability of polyolefins, and it is very useful as a modifier for polyolefins, particularly as a modifier for improving the processability of polyolefins. Polyolefin compositions obtained by mixing polyolefins with the modified polyolefin have excellent processability and can provide molded articles having excellent impact resistance, rigidity and surface properties such as gloss and hardness.

The modified polyolefin of the present invention is applicable to various polyolefins [hereinafter referred to as "polyolefin (A)"].

Representative examples of the polyolefin (A) used in the present invention are, for instance, polypropylene, high density polyethylene, low density polyethylene, linear low density polyethylene, poly- 1-butene, polyisobutylene, a random or block copolymer of propylene and ethylene of and/or 1-butene in any ratio, a terpolymer of ethylene, propylene and at most 10% by weight of a diene wherein ethylene and propylene may by present in any ratio, polymethylpentene, a copolymer of cyclopentadiene and ethylene or propylene and other cyclic polyolefins, a random, block or graft copolymer of ethylene or propylene with not more than 50% by weight of a vinyl compound such as vinyl acetate, an alkyl methacrylate, an alkyl acrylate or an aromatic vinyl compound, and other olefin homo- and copolymers. They may be used alone or in admixture thereof.

In the present invention, a propylene polymer prepared by polymerizing a monomer component containing not less than 50% by weight of propylene, and mixture of such a propylene polymer and 0.1 to 100 parts by weight, per 100 parts by weight of the propylene polymer, of an ethylene polymer prepared by polymerizing a monomer component containing not less than 50% by weight of ethylene, are preferred as the polyolefin (A).

A polyolefin having a melt flow index of not more than 10 g/10 minutes, especially not more than 5 g/10 minutes, more especially not more than 2.5 g/10 minutes, is also preferred as the polyolefin (A), since it has good kneadability and dispersibility with additives such as core-shell graft copolymer (B) and inorganic filler (C) as mentioned after and has a large melt tension, thus effects such as improvement in processability are sufficiently produced. The melt flow index as shown herein means a value measured according to ASTM D1238 under a load of 2.16 kg at a temperature, for example, 230° C. for the propylene polymers and 190° C. for the ethylene polymers.

The modified polyolefin [hereinafter referred to as "modified polyolefin (B)"] is used in an amount of 0.01 to 100 parts by weight, preferably 0.01 to 20 parts by weight, more preferably 0.01 to 10 parts by weight, per 100 parts by weight of the polyolefin (A) to be improved. When the amount of the modified polyolefin (B) is less than 0.01 parts by weight, the processability of the polyolefin (A) is not improved. When the amount is more than 100 parts by weight, the versatility of the modified polyolefin (B) such as low cost is impaired.

The polyolefin compositions of the present invention prepared by incorporating the modified polyolefin (B) into the polyolefin (A) may contain other additives such as a core-shell graft copolymer and an inorganic filler.

Core-shell graft copolymer (C) which comprises a core layer of a crosslinked elastomeric polymer and a hard layer of a vinyl compound graft-polymerized as a shell layer to the core layer, may be used in the present invention in order to further improve impact resistance, processability and surface properties of the polyolefin (A). The term "core-shell graft copolymer" as used herein comprehends a reaction product obtained by graft polymerization of a hard shell-forming component in the presence of a crosslinked elastomeric polymer (crosslinked rubber-like polymer) as a core layer.

The core-shell graft copolymer (C) is prepared by graft-polymerizing (ii) a monomer component comprising a vinyl compound onto (i) a crosslinked elastomer.

Crosslinked elastomers having a glass transition temperature of not more than 25° C. are preferred as the crosslinked elastomer (i) used to form the core layer of the graft copolymer. When the glass transition temperature is more than 25° C., the effects on improvement of the processability, impact resistance and the like, which are produced by the core-shell graft copolymer (C), tend to lower.

Preferably, the monomer component (ii) used in the preparation of the graft copolymer (C) is selected so that a polymer obtained when the monomer component (ii) is polymerized alone has a glass transition temperature of not less than 25° C. When the glass transition temperature of the polymer of the monomer component (ii) is less than 25° C., the core-shell graft copolymer (C) is aggregated into a mass.

The above-mentioned glass transition temperature and the method of the determination thereof are described in, for example, Polymer Handbook, second edition, Wiley Interscience Publication (1975). The glass transition temperature of a polymer as shown herein is a value calculated according to the following equation.

$$1/Tg = Wx/Tgx + Wy/Tgy$$

Tg: Glass transition temperature (°C.) of a copolymer of components (x) and (y)
Tgx: Glass transition temperature (°C.) of a polymer of the component (x)
Tgy: Glass transition temperature (°C.) of a polymer of the component (y)
Wx: Weight fraction (%) of a polymer of the component (x)
Wy: Weight fraction (%) of a polymer of the component (y)

Examples of the crosslinked elastomeric polymer (i) are, for instance, a diene rubber, an acrylic rubber, an olefin rubber, a silicone rubber and other rubber-like polymers. These elastomeric polymers may be used alone or in admixture thereof. The use of crosslinked diene polymer rubbers containing at least 50% by weight of a diene component and/or crosslinked acrylic polymer rubbers containing at least 50% by weight of an acrylic monomer component is preferable from the viewpoint of the compatibility of the obtained core-shell graft copolymer (C) with the polyolefin (A) and the modified polyolefin (B). The crosslinked acrylic polymer rubbers containing at least 50% by weight of an acrylic monomer component are particularly preferable from the viewpoint of good thermal stability.

Representative examples of the above-mentioned diene rubber are, for instance, diene rubbers comprising 60 to 100% by weight of a diene compound and 0 to 40% by weight of other vinyl compounds copolymerizable therewith.

Examples of the diene compound used in the above-mentioned diene rubber are, for instance, butadiene, isoprene, chloroprene, and the like. The diene compounds may be used alone or in admixture thereof. Butadiene is preferable from the viewpoints of inexpensiveness, excellent compatibility of the obtained core-shell graft copolymer (C) with the polyolefin (A) and the modified polyolefin (B), and excellent effect of improving the processability and the impact resistance.

Examples of the vinyl compound copolymerizable with the diene compound are, for instance, an aromatic vinyl compound such as styrene or α-methylstyrene; an alkyl methacrylate, particularly an alkyl methacrylate having a $C_1$ to $C_{22}$ alkyl group, such as methyl methacrylate, ethyl methacrylate, n-butyl methacrylate, isobutyl methacrylate, t-butyl methacrylate, 2-ethylhexyl methacrylate or stearyl methacrylate; an alkyl acrylate, particularly an alkyl acrylate having a $C_1$ to $C_{22}$ alkyl group, such as methyl acrylate, ethyl acrylate, n-butyl acrylate, isobutyl acrylate, t-butyl acrylate, 2-ethylhexyl acrylate or stearyl acrylate; an unsaturated nitrile compound such as acrylonitrile or methacrylonitrile; and a vinyl compound having a reactive functional group such as an acid anhydride group, carboxyl group, amino group or hydroxyl group, e.g. maleic anhydride, methacrylic acid, acrylic acid, methacrylamide, acrylamide, dimethylaminoethyl methacrylate, hydroxyethyl methacrylate or hydroxyethyl acrylate. These copolymerizable vinyl compounds may be used alone or in admixture thereof. Styrene and n-butyl acrylate are preferable from the viewpoints of inexpensiveness, excellent compatibility of the obtained core-shell graft copolymer (C) with the polyolefin (A) and the modified polyolefin (B), and excellent effect of improving the processability and the impact resistance.

The proportion of the diene compound and the vinyl compound copolymerizable therewith in the diene rubber is from 60 to 100% by weight of the diene compound and from 0 to 40% by weight of the vinyl compound, preferably from 70 to 100% by weight of the diene compound and from 0 to 30% by weight of the vinyl compound. When the proportion of the diene compound is less than 60% by weight, in other words, when the proportion of the vinyl compound is more than 40% by weight, the compatibility of the obtained core-shell graft copolymer (C) with the polyolefin (A) and the modified polyolefin (B), and effects of improving processability, impact resistance and surface properties tend to lower.

Representative examples of the above-mentioned acrylic rubber used in the preparation of the graft copolymer (C) are, for instance, acrylic rubbers comprising 60 to 100% by weight of an alkyl acrylate having a $C_2$ to $C_{22}$ alkyl group and 0 to 40% by weight of other vinyl compounds copolymerizable therewith and the like.

Examples of the alkyl acrylate having a $C_2$ to $C_{22}$ alkyl group used in the above-mentioned acrylic rubber are, for instance, ethyl acrylate, n-butyl acrylate, isobutyl acrylate, t-butyl acrylate, 2-ethylhexyl acrylate, stearyl acrylate and the like. They may be used alone or in admixture thereof. Among them, n-butyl acrylate and 2-ethylhexyl acrylate are preferable from the viewpoints of inexpensiveness, excellent compatibility of the obtained core-shell graft copolymer (C) with the polyolefin (A) and the modified polyolefin (B), and excellent effects of improving the processability and the impact resistance.

Examples of other vinyl compounds copolymerizable with the alkyl acrylate in the acrylic rubber are, for instance, vinyl compounds same as those exemplified for the diene rubber, e.g. aromatic vinyl compound, alkyl methacrylate having a $C_1$ to $C_{22}$ alkyl group, methyl acrylate, unsaturated nitrile compound, vinyl compound having a reactive functional group such as an acid anhydride group, carboxyl group, amino group or hydroxyl group. They may be used alone or in admixture thereof. Styrene and methyl methacrylate are preferable from the viewpoints of excellent processability improving effect of the obtained core-shell graft copolymer (C) and inexpensiveness.

The proportions of the alkyl acrylate having a $C_2$ to $C_{22}$ alkyl group and the other vinyl compound copolymerizable with the alkyl acrylate in the acrylic rubber are from 60 to 100% by weight of the alkyl acrylate and from 0 to 40% by weight of the vinyl compound, preferably from 65 to 100% by weight of the alkyl acrylate and from 0 to 35% by weight of the vinyl compound. When the proportion of the alkyl acrylate is less than 60% by weight, in other words, when the proportion of other vinyl compounds is more than 40% by weight, the compatibility of the obtained core-shell graft copolymer (C) with the polyolefin (A) and the modified polyolefin (B), and effects of improving the processability and the impact resistance tend to lower.

Examples of the above-mentioned olefin rubber used in the preparation of the graft copolymer (C) are, for instance, ethylene-propylene-diene rubber, butyl rubber and the like. Examples of the above-mentioned silicone rubber are, for instance, polydimethylsiloxane rubber and the like.

The crosslinked elastomeric polymer (i) can be obtained by crosslinking a elastomeric polymer as mentioned above, such as diene rubber, acrylic rubber, olefin rubber or silicone rubber.

The method of the crosslinking is not particularly limited. The method can be suitably selected, according to the kind of the used elastomeric polymer, from usual methods, for instance, a method utilizing self-crosslinking of butadiene, a method using a crosslinking agent such as divinylbenzene or 1,3-butanediol dimethacrylate, a method using a graftlinking agent such as allyl methacrylate, allyl acrylate or diallyl phthalate, and a method using a peroxide. In case of crosslinking the acrylic rubber, a method using a crosslinking agent in combination with a graftlinking agent or a method using a graftlinking agent is preferable, since active sites for grafting are produced simultaneously with the crosslinking of elastomers.

Preferably, the crosslinked elastomeric polymer (i) is prepared preferably so as to have a gel fraction resulting from the crosslinking of at least 50% by weight, especially at least 60% by weight. If the gel fraction is less than 50% by weight, a polyolefin resin composition prepared by incorporating the obtained graft copolymer tends to cause plate out onto a roll when processed by calendering or the like, thus such a graft copolymer has no sufficient processability-improving effect.

The gel fraction as used herein shows a proportion of insoluble matter measured by immersing the crosslinked elastomer into a good solvent for the elastomer, such as toluene or ethyl methyl ketone, for 48 hours and centrifuging the mixture to separate the insoluble matter.

Examples of the monomer component (ii) used for forming the shell layer of the graft copolymer (C) are, for instance, vinyl compounds same as those exemplified as the vinyl compound copolymerizable with the diene compound for the preparation of the crosslinked elastomer core (i), that is to say, aromatic vinyl compounds, alkyl methacrylates having a $C_1$ to $C_{22}$ alkyl group, alkyl acrylates having a $C_1$ to $C_{22}$ alkyl group, unsaturated nitrile compounds, and vinyl compounds having a reactive functional group such as an acid anhydride group, carboxyl group, amino group or hydroxyl group. These monomers (ii) may be used alone or in admixture thereof.

It is preferable to use, as the monomer component (ii), a mixture of 50 to 100% by weight of the aromatic vinyl compound and/or the alkyl methacrylate with 0 to 50% by weight of other vinyl compounds copolymerizable therewith, since it is hard to cause a decrease of polymerizability and cost up. From the viewpoints of good polymerizability and inexpensiveness, it is particularly preferable to use styrene and α-methylstyrene as the aromatic vinyl compound, and to use an alkyl methacrylate having a $C_1$ to $C_4$ alkyl group as the alkyl methacrylate.

The ratio of the crosslinked elastomer (i) to the monomer component (ii) used in the preparation of the graft copolymer (C) is from 40:60 to 95:5 by weight, preferably 40:60 to 90:10 by weight. When the ratio of the crosslinked elastomer is less than 40, in other words, when the ratio of the monomer component is more than 60, the obtained core-shell graft copolymer has decreased effects of improving the processability and impact resistance of polyolefins. When the ratio of the crosslinked elastomer is more than 95, in other words, when the ratio of the monomer component is less than 5, the obtained core-shell graft copolymer is in the form of a mass.

The core-shell graft copolymer (C) can be prepared in a usual radical polymerization manner, and polymerization methods such as suspension polymerization and emulsion polymerization are applicable to the preparation. Emulsion polymerization is preferable from the viewpoints of control of particle size and particle structure.

Particle size of the core-shell graft copolymer (C) may be increased by adding an acid, a salt or a coagulant to the system in polymerization step in a know manner.

The average particle size of the core-shell graft copolymer (C) is preferably not more than 3 μm, more preferably not more than 2.5 μm, in raising the surface properties of the obtained polyolefin resin compositions.

The core-shell graft copolymer (C) is used in an amount of 0.01 to 100 parts by weight, preferably 0.1 to 80 parts by weight, more preferably 0.5 to 70 parts by weight, per 100 parts by weight of the polyolefin (A). When the amount of the graft copolymer is less than 0.01 parts by weight, the effects of improving the properties of the polyolefin, such as surface properties, processability and impact resistance, to be produced by the graft copolymer are not sufficient. When the amount of the graft copolymer is more than 100 parts by weight, properties such as heat resistance and rigidity that the polyolefin (A) originally possess tend to decrease.

Inorganic filler (D) may be incorporated into the polyolefin composition of the present invention for the purpose of improving rigidity, paintability, printability and the like of the polyolefin composition.

Representative examples of the inorganic filler (D) are, for instance, heavy calcium carbonate, precipitated calcium carbonate, talc, glass fiber, magnesium carbonate, mica, kaolin, calcium sulfate, barium sulfate, titanium white, white carbon, carbon black, aluminum hydroxide, magnesium hydroxide and the like. The fillers may be used alone or in admixture thereof. Heavy calcium carbonate, precipitated calcium carbonate and talc are preferable from the viewpoint of availability.

It is preferable that the average particle size of the inorganic filler (D) is not more than about 10 μm, especially not more than about 5 μm, from the viewpoint of the surface properties of the obtained polyolefin composition.

The inorganic filler (D) is used in an amount of 0.1 to 1,000 parts by weight, preferably 5 to 300 parts by weight, more preferably 10 to 100 parts by weight, per 100 parts by weight of the polyolefin (A). When the amount of the inorganic filler is less than 0.1 part by weight, the rigidity is not sufficiently improved. When the amount of the inorganic filler is more than 1,000 parts by weight, the surface properties of the resulting polyolefin composition tend to deteriorate.

The method for preparing the polyolefin composition of the present invention is not particularly limited. For example, the polyolefin composition is prepared by mixing polyolefin (A), modified polyolefin (B) and optionally at least one of core-shell graft copolymer (C) and inorganic filler (D) in a usual mixing manner such as extrusion mixing or roll mixing.

The polyolefin composition of the present invention may further contain other known additives, e.g. stabilizer, lubricant and known core-shell graft copolymers as used for improving the processability of vinyl chloride resins.

Representative examples of the stabilizer are, for instance, a phenol stabilizer such as pentaerythrityl-tetrakis[ 3-(3,5-di-t-butyl-4-hydroxyphenyl)propionate] or triethyleneglycol-bis[3-(3-t-butyl-5-methyl-4-hydroxyphenyl)propionate], a phosphorus stabilizer such as tris(monononylphenyl)phosphite or tris( 2,4-di-t-butylphenyl)phosphite, a sulfur stabilizer such as dilaurylthiodipropionate, and the like. They may be used alone or in admixture thereof. The amount of the stabilizer is usually from about 0.01 to about g parts by weight, preferably about 0.08 to about 2 parts by weight, per 100 parts by weight of the polyolefin (A).

Representative examples of the lubricant are, for instance, sodium, calcium, magnesium or other metal salts of a saturated or unsaturated fatty acid such as lauric acid, palmitic acid, oleic acid or stearic acid. They may be used alone or in admixture thereof. The amount of the lubricant is usually from about 0.1 to about 3 parts by weight, preferably about 0.1 to about 2 parts by weight, per 100 parts by weight of the polyolefin (A).

The polyolefin composition of the present invention has remarkably improved excellent processability, impact resistance, rigidity, surface properties and the like. Therefore, the polyolefin composition of the present invention can be processed into useful molded articles by means of various molding methods including molding methods by which it has been difficult to mold known polyolefin compositions. These molding methods include, for instance, calendering, extrusion, thermoforming, injection molding, blow molding, expansion molding and the like.

For instance, the polyolefin composition of the present invention can be formed into films or sheets by calendering or extrusion. The thus obtained films or sheets can be further formed into molded articles by thermoforming them at a temperature suitable for the used polyolefin composition. Also, it is possible to prepare injection molded articles or hollow molded articles by injection molding or blow molding, respectively, from pellets as obtained by extruding the polyolefin composition. Further, foamed articles can be prepared by adding a blowing agent to the polyolefin composition of the present invention and then expansion-molding the mixture using an extruder or the like.

The present invention is more specifically described and explained by means of the following Examples and Comparative Examples in which all % and parts are by weight unless otherwise noted. It is to be understood that the present invention is not limited to these Examples.

EXAMPLE 1

To 5,000 parts of pure water were added 700 parts of crystalline random polypropylene particles (ethylene content 3%, DSC fusion starting temperature 80° C., DSC melting point 146.7° C.), 300 parts of styrene, 3.6 parts of di-t-butyl peroxide (10 hour half-life temperature 124° C.), 100 parts of calcium phosphate and 6 parts of an emulsifier (trade mark "LATEMUL PS", product of Kao Corporation) in a closed pressure reactor. They were stirred to give an aqueous suspension.

After heating the aqueous suspension at 100° C. for 1 hour with stirring, it was further heated at 140° C. for 5 hours with stirring to perform the polymerization. The obtained particles were taken out of the reaction mixture, washed with water to remove the residual monomer, calcium phosphate, the emulsifier and the peroxide, and dried to give while particles of a modified polypropylene (B)-1. The polymerization conversion was 90%.

EXAMPLE 2

A modified polypropylene (B)-2 was prepared in the same manner as in Example 1 except that 300 parts of methyl methacrylate was used instead of 300 parts of styrene. The obtained modified polyolefin (B)-2 was white particles. The conversion was 92%.

EXAMPLE 3

A modified polypropylene (B)-3 was prepared in the same manner as in Example 1 except that a monomer mixture of 210 parts of methyl methacrylate and 90 parts of n-butyl acrylate was used instead of 300 parts of styrene. The obtained modified polypropylene (B)-3 was white particles. The conversion was 93%.

COMPARATIVE EXAMPLE 1

The procedure of Example 1 was repeated except that t-butyl peroxybenzoate (10 hour half-life temperature 104 ° C.) was used instead of di-t-butyl peroxide, and the aqueous suspension was heated at 90° C. for 1 hour with stirring and was then subjected to polymerization by heating for 5 hours with stirring at 110° C. which was lower than the temperature of beginning the substantial fusion of the crystal region of the polypropylene. The thus obtained modified polypropylene B' was in the form of white particles. The conversion was 89%.

EXAMPLE 4

To 100 parts of polypropylene having a melt flow index of 0.5 g/10 minutes at 230° C. (commercially available under the trade mark "Hipol" B-200 made by Mitsui Petrochemical Industries, Ltd.) (hereinafter referred to as "PP") was added 1 part of the modified polypropylene (B)-1. The mixture was kneaded and pelletized by extruding at 200° C. and 100 r.p.m. using a twin-screw extruder (screw diameter: 44 mm, L/D: 30).

The melt tension of the obtained pellets was measured using a melt tension tester (trade mark "Capirograph" made by Toyo Seiki Seisaku-sho, Ltd.) with dies having a diameter of 1 mm and a length of 10 mm at 200° C., rate of extrusion 5 mm/minute and rate of drawing 1 m/minute.

The pellets were kneaded at 200° C. on rolls to give a rolled sheet, and the sheet was then press-molded to give test specimens for Izod impact resistance test according to ASTM-D256 and for flexural elasticity test according to ASTM-D790.

Also, a sheet having a size of 100 mm×100 mm×1.5 mm (thickness) was formed from the pellets in the same manner as above. The sheet was fixed with a damp having an opening of 76 mm×76 mm, and was heated in an oven at 190° C. for 30 minutes to estimate draw down of the sheet.

The results of the measurement of melt tension, Izod impact resistance, flexural elasticity and draw down are shown in Table 1.

EXAMPLE 5 TO 11 AND COMPARATIVE EXAMPLES 2 TO 5

The procedure of Example 4 was repeated except that the ingredients shown in Table 1 were used.

The results are shown in Table 1.

TABLE 1

| | Ingredients (part) | | | Physical properties | | | | |
| --- | --- | --- | --- | --- | --- | --- | --- | --- |
| | Polyolefin (A) | Modified polypropylene (B) | Others | Melt tension (g) | Izod impact resistance (kg · cm/cm) | | Flexural elasticity (kg/cm²) | Draw down (mm) |
| | | | | | 23° C. | −20° C. | | |
| Ex.4 | PP(100) | B-1 (1) | — | 4.2 | 3 | 2 | 14000 | 9 |
| Ex.5 | PP(100) | B-1 (2.5) | — | 4.8 | 4 | 3 | 14000 | 5 |
| Ex.6 | PP(100) | B-1 (5) | — | 5 | 4 | 3 | 15000 | 1 |
| Ex.7 | PP(100) | B-2 (5) | — | 4.3 | 3 | 3 | 14000 | 25 |
| Ex.8 | PP(100) | B-2 (10) | — | 4.7 | 4 | 3 | 15000 | 15 |
| Ex.4 | PP(100) | B-3 (5) | — | 4.2 | 3 | 3 | 11000 | 9 |
| Ex.10 | PP(100) LDPE(20) | B-1 (2.5) | — | 4.8 | 5 | 3 | 11000 | 5 |
| Ex.11 | PP(100) LDPE(50) | B-1 (5) | — | 5 | 5 | 3 | 10000 | 1 |
| Com. | PP(100) | — | — | 3.8 | 3 | 2 | 14000 | 90 |

TABLE 1-continued

| | Ingredients (part) | | | Physical properties | | | | |
|---|---|---|---|---|---|---|---|---|
| | Polyolefin | Modified polypropylene (B) | Others | Melt tension | Izod impact resistance (kg · cm/cm) | | Flexural elasticity | Draw down |
| | (A) | | | (g) | 23° C. | −20° C. | (kg/cm²) | (mm) |
| Ex.2 Com. Ex.3 | PP(100) LDPE(100) | — | — | 4.2 | 4 | 2 | 11000 | 40 |
| Com. Ex.4 | PP(100) LDPE(50) | — | — | 4.3 | 4 | 2 | 9000 | 30 |
| Com. Ex.5 | PP(100) | — | B'(10) | 4.2 | 3 | 2 | 14000 | 35 |

(Note)
LDPE: Low density polyethylene having a melt flow index of 0.25 g/10 minutes at 190° C. (hereinafter referred to as "LDPE")

It is observed in Table 1 that the polyolefin compositions according to the present invention as obtained in Examples 4 to 11 by incorporating the modified polyolefins obtained in Examples 1 to 3 into polyolefins show a small draw down which is an index of thermoforming or blow molding, and accordingly have a remarkably improved processability.

EXAMPLES 12 AND 13 AND COMPARATIVE EXAMPLES 6 AND 7

Butadiene was emulsion-polymerized to give a crosslinked polybutadiene having a glass transition temperature of −85° C., an average particle size of 0.25 μm and a gel fraction of 85%.

To 70 parts (solid matter) of the obtained latex of crosslinked polybutadiene rubber was added 30 parts of a monomer component consisting of 15 parts of methyl methacrylate and 15 parts of styrene (glass transition temperature of a polymer formed from the monomer component: 100° C.). The mixture was subjected to graft copolymerization by emulsion polymerization to give a core-shell graft copolymer. The final conversion was 98%. The average particle size of the graft copolymer was 0.26 μm.

The graft copolymer was salted out of the obtained latex thereof, dehydrated and dried to give a powder.

The procedure of Example 4 was repeated except that the polypropylene (PP), the modified polypropylene B-1 and the above core-shell graft copolymer powder were mixed in amounts shown in Table 2.

The results of the measurement of physical properties are shown in Table 2.

Also, the surface condition of a rolled sheet obtained by roll mixing was visually observed to estimate the appearance of the sheet according to the following criteria. The results are shown in Table 2.

Appearance

A: Surface has no unevenness and has excellent gloss.

B: Surface is slightly uneven and slightly inferior in gloss.

C: Surface is very rough and poor in gloss.

TABLE 2

| | Ingredients (part) | | | Physical properties | | | | | |
|---|---|---|---|---|---|---|---|---|---|
| | Polyolefin | Modified polypropylene | Core-shell graft copolymer | Melt tension | Izod impact resistance (kg · cm/cm) | | Flexural elasticity | Draw down | Appearance of rolled |
| | (A) | (B) | (C) | (g) | 23° C. | −20° C. | (kg/cm²) | (mm) | sheet |
| Ex.12 | PP(100) | B-1 (5) | 20 | 5 | 12 | 9 | 13000 | 1 | A |
| Ex.13 | PP(100) | B-1 (5) | 50 | 5.3 | 21 | 13 | 10000 | 0 | A |
| Com. Ex.6 | PP(100) | — | 20 | 4.5 | 7 | 5 | 12000 | 20 | A |
| Com. Ex.7 | PP(100) | — | 50 | 4.6 | 13 | 7 | 9000 | 5 | A |

From the results shown in Table 2, it is understood that the polyolefin compositions obtained in Examples 12 and 13 according to the present invention cause no or a little draw down and, therefore, have a remarkably improved processability. It is further observed that they are remarkably improved in surface properties of sheets and impact resistance and are excellent in balance between impact resistance and rigidity (flexural elasticity).

EXAMPLES 14 AND 15 AND COMPARATIVE EXAMPLES 8 AND 9

The procedure of Example 4 was repeated except that polyolefin (A), modified polypropylene (B-1) and precipitated calcium carbonate surface-treated with a fatty acid (average particle size: 0.15 μm) were mixed in amounts shown in Table 3.

The results of the measurement of physical properties are shown in Table 3.

TABLE 3

| | Ingredients (part) | | | Physical properties | | | | | |
|---|---|---|---|---|---|---|---|---|---|
| | Polyolefin | Modified polypro-pylene | Inorganic filler | Melt tension | Izod impact resistance (kg · cm/cm) | | Flexural elasticity | Draw down | Appearance of rolled |
| | (A) | (B) | (D) | (g) | 23° C. | −20° C. | (kg/cm²) | (mm) | sheet |
| Ex.14 | PP(100) | B-1 (5) | 50 | 5.1 | 8 | 6 | 17000 | 0 | B |
| Ex.15 | PP(100) LDPE(50) | B-1 (5) | 50 | 4.7 | 9 | 6 | 11000 | 0 | B |
| Com. Ex.8 | PP(100) | — | 50 | 4.7 | 8 | 4 | 16000 | 90 | C |
| Com. Ex.9 | PP(100) LDPE(50) | — | 50 | 4.3 | 8 | 6 | 9000 | 20 | C |

From the results shown in Table 3, it is understood that the polyolefin compositions obtained in Examples 14 and 15 according to the present invention cause no or little draw down and, therefore, have a remarkably improved processability, and are also excellent in balance between the impact resistance and rigidity (flexural elasticity).

EXAMPLES 16 AND 17 AND COMPARATIVE EXAMPLES 10 AND 11

The procedure of Example 4 was repeated except that polyolefin (A) and modified polypropylene (B-1) were mixed with the core-shell graft copolymer obtained in Examples 12 and 13 and the fatty acid-treated precipitated calcium carbonate used in Examples 14 and 15 according to the formulation shown in Table 4.

The results are shown in Table 4.

methods to provide useful molded articles having excellent properties such as impact resistance, rigidity and surface properties.

In addition to the ingredients used in the Examples, other ingredients can be used in the Examples as set forth in the specification to obtain substantially the same results.

What we claim is:

1. A modified polyolefin prepared by a process which comprises preparing an aqueous suspension containing (a) a crystalline polyolefin, (b) 1 to 500 parts by weight of a vinyl monomer per 100 parts by weight of the crystalline polyolefin, and (c) 0.01 to 10 parts by weight of a radical polymerization initiator per 100 parts by weight of the vinyl monomer, impregnating the crystalline polyolefin (a) with the vinyl monomer (b), and polymerizing the vinyl monomer (b) at a temperature equal to or higher than a temperature at which the crystal region of the crystalline polyolefin (a) begins to substantially melt.

2. The modified polyolefin of claim 1, wherein said vinyl monomer (b) comprises 80 to 100% by weight of at least one first monomer selected from the group consisting of an aromatic vinyl compound, an alkyl methacrylate having a $C_1$ to $C_{22}$ alkyl group, an alkyl acrylate having a $C_1$ to $C_{22}$ alkyl group and an unsaturated nitrile compound, and 20 to 0% by weight of other vinyl monomers copolymerizable with said first monomer.

3. The modified polyolefin of claim 1, wherein said vinyl monomer (b) comprises 80 to 100% by weight of at least one first monomer selected from the group consisting of an aromatic vinyl compound, an alkyl methacrylate having a $C_1$ to $C_4$ alkyl group, an alkyl acrylate having a $C_1$ to $C_8$ alkyl group and an unsaturated nitrile compound, and 20 to 0% by

TABLE 4

| | Ingredients (part) | | | | Physical properties | | | | | |
|---|---|---|---|---|---|---|---|---|---|---|
| | Polyolefin | Modified polypro-pylene | Core-shell graft copolymer | Inorganic filler | Melt tension | Izod impact resistance (kg · cm/cm) | | Flexural elasticity | Draw down | Appearance of rolled |
| | (A) | (B) | (C) | (D) | (g) | 23° C. | −20° C. | (kg/cm²) | (mm) | sheet |
| Ex.16 | PP(100) | B-1 (5) | 20 | 50 | 5.2 | 16 | 10 | 14000 | 1 | A |
| Ex.17 | PP(100) LDPE(50) | B-1 (5) | 20 | 50 | 5.1 | 21 | 14 | 12000 | 0 | A |
| Com. Ex.10 | PP(100) | — | 20 | 50 | 4.6 | 12 | 6 | 14000 | 25 | A |
| Com. Ex.11 | PP(100) LDPE(50) | — | 20 | 50 | 4.7 | 13 | 7 | 11000 | 20 | A |

From the results shown in Table 4, it is understood that the draw down, which is an index of thermoforming, blow molding or the like, of the polyolefin compositions obtained in Examples 16 and 17 according to the present invention is very small and, therefore, the processability is remarkably improved, and that the compositions are also excellent in surface properties of sheets and in balance between impact resistance and rigidity (flexural elasticity).

As explained above, the modified polyolefin of the present invention has an excellent effect of improving the processability of polyolefins. Thus, the polyolefin composition of the present invention prepared by mixing a polyolefin with the modified polyolefin and optionally with a core-shell graft copolymer and/or an inorganic filler has an excellent processability and can be easily molded by various molding weight of other vinyl monomers copolymerizable with said first monomer.

4. The modified polyolefin of claim 2, wherein said first monomer is at least one member selected from the group consisting of styrene, methyl methacrylate and n-butyl acrylate.

5. The modified polyolefin of claim 1, wherein said vinyl monomer (b) is styrene.

6. The modified polyolefin of claim 1, wherein said vinyl monomer (b) is methyl methacrylate.

7. The modified polyolefin of claim 1, wherein said vinyl monomer (b) is n-butyl acrylate.

8. The modified polyolefin of claim 1, wherein said radical polymerization initiator (c) is present in said aqueous suspension in an amount of 1 to 10 parts by weight per 100 parts by weight of said vinyl monomer (b).

9. The modified polyolefin of claim 1, wherein said crystalline polyolefin (a) is a propylene homopolymer or a propylene-based polyolefin containing at least 75% by weight of propylene units.

10. The modified polyolefin of claim 1, wherein said impregnating is carried out by heating said aqueous suspension at a temperature at which said vinyl monomer (b) is not substantially polymerized.

11. The modified polyolefin of claim 1, wherein said impregnating is carried out by stirring said aqueous suspension at a temperature within the range of T–50° C. to T–10° C. wherein T is a 10 hour half-life temperature of radical polymerization initiator (c) used.

12. The modified polyolefin of claim 1, wherein said polymerizing is carried out for 0.5 to 10 hours at a temperature within the range of MP–20° C. to MP+20° C. wherein MP is the melting point of said crystalline polyolefin (a) and under which the crystal region of said crystalline polyolefin (a) is at least partially fused.

13. A polyolefin composition comprising (A) a polyolefin, and (B) 0.01 to 100 parts by weight of the modified polyolefin of claim 1 per 100 parts by weight of said polyolefin (A).

14. The composition of claim 13, wherein the amount of said modified polyolefin (B) is from 0.01 to 20 parts by weight.

15. The composition of claim 13, wherein said polyolefin (A) is a propylene homopolymer or copolymer containing at least 50% by weight of propylene units.

16. The composition of claim 13, wherein said polyolefin (A) is a mixture of a propylene polymer containing at least 50% by weight of propylene units and 0.1 to 100 parts by weight of an ethylene polymer containing at least 50% by weight of ethylene units per 100 parts by weight of said propylene polymer.

17. The composition of claim 13, wherein said impregnating is carried out by stirring said aqueous suspension at a temperature within the range of T–50° C. to T–10° C. wherein T is a 10 hour half-life temperature of radical polymerization initiator (c) used.

18. The composition of claim 13, wherein said polymerizing is carried out for 0.5 to 10 hours at a temperature within the range of MP–20° C. to MP+20° C. wherein MP is the melting point of said crystalline polyolefin (a) and under which the crystal region of said crystalline polyolefin (a) is at least partially fused.

19. The composition of claim 13, which contains at least one of (C) 0.01 to 100 parts by weight of a core-shell graft copolymer and (D) 0.1 to 1,000 parts by weight of an inorganic filler, per 100 parts by weight of said polyolefin (A), said core-shell graft copolymer comprising 40 to 95% by weight of a core layer of a crosslinked elastomer and 60 to 5% by weight of a shell layer of a vinyl polymer grafted onto said crosslinked elastomer.

20. The composition of claim 19, wherein said crosslinked elastomer has a glass transition temperature of not more than 25° C. and said vinyl polymer has a glass transition temperature of not less than 25° C.

\* \* \* \* \*